United States Patent [19]
La Barre

[11] Patent Number: 5,850,681
[45] Date of Patent: Dec. 22, 1998

[54] METHOD AND ARRANGEMENT FOR ANGULARLY POSITIONING A CONTAINER OR A CONTAINER PREFORM ON A MANDREL INSERTED IN THE NECK THEREOF

[75] Inventor: Paul La Barre, Saint Adresse, France

[73] Assignee: Sidel, Le Havre, France

[21] Appl. No.: 553,657

[22] PCT Filed: May 17, 1994

[86] PCT No.: PCT/FR94/00586

§ 371 Date: Jun. 28, 1996

§ 102(e) Date: Jun. 28, 1996

[87] PCT Pub. No.: WO94/26499

PCT Pub. Date: Nov. 24, 1994

[30] Foreign Application Priority Data

May 19, 1993 [FR] France .................................. 93 06056

[51] Int. Cl.⁶ ................ B23Q 3/00; B23Q 7/00
[52] U.S. Cl. ...................... 29/464; 29/559; 264/DIG. 64
[58] Field of Search ............................ 29/464, 559, 240; 264/516, 523, 900, 909, DIG. 1, DIG. 33, DIG. 64

[56] References Cited

FOREIGN PATENT DOCUMENTS 1520693   4/1968   France .

Primary Examiner—David P. Bryant
Attorney, Agent, or Firm—Sughrue, Mion, Zinn, Macpeak & Seas, PLLC

[57] ABSTRACT

The invention seeks to position a thermoplastic container or container preform having a neck (1) with a substantially circularly cylindrical inside wall (2) in a predetermined angular position on a mandrel (11) inserted into the neck (1); the inside wall (2) of the neck (1) includes at least one approximately radial projection (8), and the outside wall (13) of the mandrel includes at least one thrust shoulder (14) facing towards the free end of the mandrel, to guide the radial projection, the shoulder (14) extending over the wall and being inclined relative to the axis of the mandrel, looking means is also provided to stop relative movement of the mandrel and of the container when the neck thereof is disposed in a predetermined angular orientation relative to the mandrel.

18 Claims, 4 Drawing Sheets

METHOD AND ARRANGEMENT FOR ANGULARLY POSITIONING A CONTAINER OR A CONTAINER PREFORM ON A MANDREL INSERTED IN THE NECK THEREOF

The present invention relates to positioning a container or a container preform of thermoplastic material and having a neck with a circularly cylindrical inside wall, in a predetermined angular position on a mandrel inserted inside said neck.

The invention is particularly, but not exclusively applicable to relatively accurate angular positioning of a preform of thermoplastic material relative to the walls of a mold for forming a container, e.g. by blow molding or by stretch blow molding; this may relate particularly to angularly positioning special zones (e.g. thicker zones) of the preform properly relative to the walls of the mold cavity, or it may relate to positioning the start of the screw thread on the neck of a preform. Such proper positioning need not necessarily be constituted by a single position over 360°, but commonly, it may be constituted by any one out of n possible positions over 360°; in other words, the preform needs to be rotated through some maximum angle of not more than 360°/n about its own axis on being received by a supporting mandrel (which in the example under consideration of subsequent processing by blow molding or by stretch blow molding may be the outlet of a blow nozzle), while the mandrel is itself in a known position relative to the walls of the mold cavity, given the structure of the installation.

Document FR-A-1 520 693 does indeed disclose a stopper system for flasks or the like which makes use of a pair of co-operating elements by means of a projection and an inclined shoulder respectively provided on the inside face of a covering stopper and on the outside face of the neck of a flask. However, that document provides no information relating to the angular positioning of a container or a container preform on a mandrel inserted into the neck thereof. Furthermore, the technical solution proposed in that document for closing a flask consists in fitting a female part (covering stopper) arranged to cover a male part (neck): Thus, in order to resolve the problem on which the present invention is based, that document under consideration suggests no more than positioning the container or the preform by means of a member surrounding the neck, as in the above-mentioned document. Unfortunately such a solution is not suitable for resolving the problem on which the invention is based, which problem aims to position the container angularly, by means of its neck, relative to a support mandrel inserted inside said neck. As a result the technical solution proposed in the above-mentioned document cannot be adopted, as described, for the purpose of resolving the problem posed in the context of the invention.

The object of the invention is to propose means—both a method and a system—that are technologically as simple as possible while remaining effective and reliable, and which as far as possible require minimal modifications to presently known installations, preferably being capable of being provided on [installations that are already in existence, with a minimum amount of modification thereto.]

To these ends, in a first aspect, the invention provides a method of positioning a container or a container preform of thermoplastic material and having a neck with a circularly cylindrical inside wall, in a predetermined angular position on a mandrel inserted inside said neck, which method is essentially characterized in that at least one radial projection is provided on a surface selected from the inside wall of the neck and the outside wall of the mandrel, to bear against at least one thrust shoulder provided on a surface selected respectively from the outside wall of the mandrel and the inside wall of the neck, said shoulder facing respectively towards the free end of the mandrel or of the neck and extending over said wall while being inclined relative to the axis of the mandrel or of said neck, respectively, and in that the mandrel is caused to penetrate into the neck, thereby causing the neck to rotate relative to the mandrel, rotation being generated by said radial projection sliding against said shoulder, until locking means prevent relative movement of the mandrel and of the container once the neck is disposed in a predetermined angular orientation relative to the mandrel.

Advantageously, at least one radial projection is provided on the inside wall of the neck and at least one thrust shoulder is provided on the outside wall of the mandrel, said shoulder facing towards the free end of the mandrel and extending over said outside wall while being inclined relative to the axis of the mandrel.

Preferably, the mandrel is caused to penetrate into the neck, thereby causing the neck to rotate relative to the mandrel under drive generated by said radial projection sliding against said shoulder, until the free end of the neck comes into abutment against axial locking means provided on the outside wall of the mandrel, whereby the container is disposed in predetermined annular and axial positions relative to the mandrel; in a [axial locking means provided on the outside wall of the mandrel, whereby the container is disposed in predetermined annular and axial positions relative to the mandrel; in a] particular embodiment that is particularly advantageous when the mandrel is the end of a blow nozzle, the axial locking means provided on the mandrel are also arranged to co-operate in sealed manner with the free edge of the neck of the container.

In a second aspect, for implementing the above method, the invention provides a system for positioning a container or a container preform of thermoplastic material, having a neck with a substantially circular cylindrical inside wall, in a predetermined angular position on a mandrel inserted into said neck, which system is essentially characterized in that a surface selected from the inside wall of the neck and the outside wall of the mandrel includes at least one approximately radial projection, and in that a surface respectively selected from the outside wall of the mandrel and the inside wall of the neck, includes at least one thrust shoulder facing respectively towards the free end of the mandrel or of the neck for the purpose of guiding said projection, said shoulder extending over the wall while being inclined relative to the axis of the mandrel or of the neck, respectively, locking means also being provided to stop relative movement of the mandrel and of the container when the neck is disposed in a predetermined angular orientation relative to the mandrel.

Advantageously, the inside wall of the neck includes at least one approximately radial projection and the outside wall of the mandrel includes at least one thrust shoulder facing towards the free end of the mandrel for the purpose of guiding said radial projection of the neck, said shoulder extending over the outside wall of the mandrel and being inclined relative to the axis of the mandrel.

Preferably, the locking means are [axial locking] means [provided on the outside wall of the mandrel and suitable for receiving in abutment the free end of the] neck when the mandrel is inserted in the neck; in particular, the axial locking means of the mandrel are also arranged to receive the free edge of the neck in sealed axial abutment, which solution is of particular interest, particularly when the mandrel is constituted by the end of a blow nozzle.

In practice, because of ease of implementation, it is advantageous for the surface selected from the outside wall of the mandrel and the inside wall of the neck to have an even number 2n of shoulder lengths that are circumferentially distributed and that have alternately opposite inclinations to form successive Vs enabling the angular position of the neck relative to the mandrel to be predetermined to within an angle of 360°/n. In particular, the above-specified locking means are constituted by the insides of the tips of the V-shapes formed by two successive lengths of the shoulder.

In a simple embodiment, the wall provided with the shoulder lengths possesses a leading portion of diameter that is perceptibly smaller than the diameter of its trailing portion, which leading and trailing portions are connected together, forming the above-specified succession of shoulder lengths.

If it is also desired to provide reliable mechanical constraint in rotation between the neck and the mandrel, it is advantageous for said means for constraining rotation to comprise at least one longitudinally extending notch situated at the trailing end of the shoulder and shaped to receive at least a portion of the projection, preferably by ensuring that the notch is situated at the location of the tip of a V formed by two shoulders that are inclined relative to each other, and that the end of the notch constitutes said angular locking means.

To facilitate bringing the projection into contact with the shoulder and then sliding the projection therealong, it is preferable for the leading end of the radial projection to possess at least one cut flat, or two flats cut to form an arrow.

To ensure that the arrangement of the invention is reliable in all initial relative positions of the mandrel and of the neck, it is desirable for the shoulder to extend with a relatively small inclination, e.g. less than 45°, relative to the axis of the mandrel or of the neck.

When the number n of possible predetermined positions is relatively large, the maximum angular amplitude of rotation of the neck relative to the mandrel, $2\pi/n$, is small, and the shoulder which then has a well-marked slope may have a substantially constant inclination relative to the axis of the mandrel or of the neck over its entire length. However, if the above-mentioned angular amplitude is too large, then a shoulder of constant inclination would have insufficient slope to cause the neck to rotate, given the high degree of friction that occurs in contact between the shoulder and the projection; under such circumstances, it is preferable for the shoulder to extend with inclination that varies about the axis of the mandrel or of the neck, said inclination being of smaller value in the vicinity of the leading end of the mandrel or of the neck (i.e. the end closest to the free end of the mandrel or of the neck).

The reliability of the arrangement is improved if a plurality of projections are provided extending approximately radially and substantially regularly distributed around the circumference, e.g. two projections that are diametrically opposite, or preferably three that are spaced apart by about 120°.

When the projection is provided on the inside wall of the neck and to ensure that the presence of the projection does not prevent unmolding of the preform after fabrication by molding, and when the projection is of sufficient mechanical strength, it is advantageous for the substantially radial projection to be constituted in the form of a rib that extends longitudinally over the inside wall of the neck; for example the longitudinal rib may extend over approximately the entire height of the neck from the vicinity of the orifice to approximately level with an annular flange that surrounds approximately the base of the neck.

The invention will be better understood on reading the following detailed description of certain preferred embodiments that are given purely as non-limiting examples.

In the description, reference is made to the accompanying drawings, in which.

Figure 1:
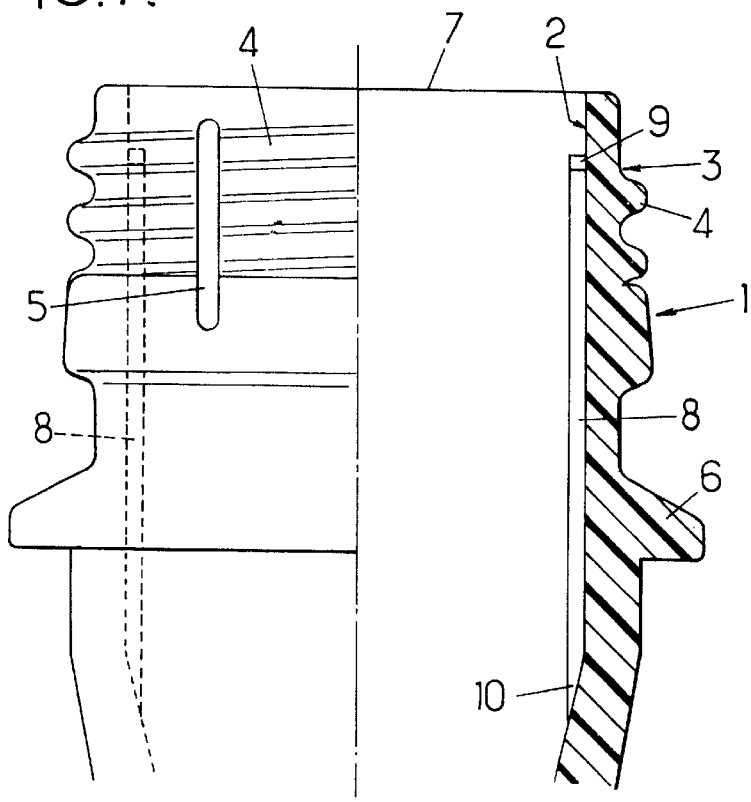
FIG. 1 is a side view, half-outside view and half-section view, showing the neck of a preform or a container arranged in accordance with the invention.
Figure 2:
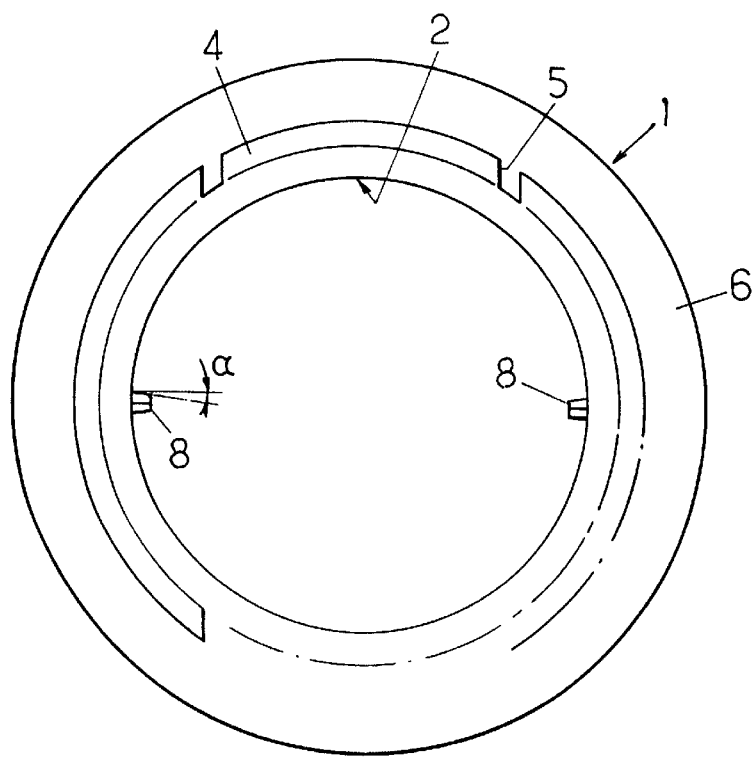
FIG. 2 is a plan view of the FIG. 1 neck.

It is initially recalled that a mandrel of thermoplastic material that is intended for fabricating a container such as a bottle or a flask by mechanical deformation as occurs in blow molding or in stretch blow molding, is fabricated by molding and is already provided on being fabricated with a neck that has its final shape and dimensions. As a result, the neck shown in FIG. 1 may equally well be the neck of a preform since it is above all under such circumstances that the invention would appear to be of greatest advantage, or it could be the neck of a container that has already been formed, or indeed of an intermediate container obtained from an intermediate step in the fabrication of a final container.

In a typical application which, although not exclusive, nevertheless appears to be a preferred application of the method and of the arrangement of the invention as described below, the neck is the neck of a preform which, as a preliminary to the process of fabricating a container, needs to be fitted on a mandrel that is designed to hold it inside a mold for blow molding or stretch blow molding, and in the example shown in FIG. 5 the mandrel is, in practice, the outlet of a blow nozzle.

The invention is intended to give the preform or the container a defined angular position that may be unique (one possible position over 360°) or that may be one particular position out of a plurality of possible positions (n possible positions at 360°/n intervals), e.g. in such a manner that, during fabrication, certain portions of the preform body can be positioned relative to functional means (walls of the mold in the example under consideration), by relying on the fact that the mandrel is in an angular orientation that is capable of being known continuously because of the structure of the installation.

With reference initially to FIGS. 1 to 4, the neck 1 is traditionally shaped with a circularly cylindrical inside wall 2 and an outside wall 3 that is provided, near the top, e.g. with a thread 4 for subsequently receiving a screw cap (not shown) and optionally including degassing slots 5, and which is provided towards the bottom with a support flange 6 of larger diameter. The edge of the orifice of the neck is given reference 7.

In accordance with the invention, it is possible to provide at least one projection 8 on the inside wall 2 of the neck, and preferably to provide at least two thereof (FIGS. 1 to 3), and advantageously at least three projections that are spaced apart by about 120° so that the mandrel is properly guided inside the neck (FIG. 4), the projections extending substantially radially and being regularly spaced apart from one another angularly.

Each projection 8 extends longitudinally over practically the entire height of the neck (with the exception of the zone situated immediately beneath the edge 7) and constitutes a rib in the form of an engaged column. In the example shown, the rib is of slightly trapezium-shaped section or quasi-square section having non-sharp corners and the thickness of the projection in the typically example of a standardized neck known as "28 mm ALCOA" is about 0.8 mm for a width that is likewise about 0.8 mm.

The top end of the rib has a cut flat 9, and preferably has two flats cut to form an arrow.

Figure 3:
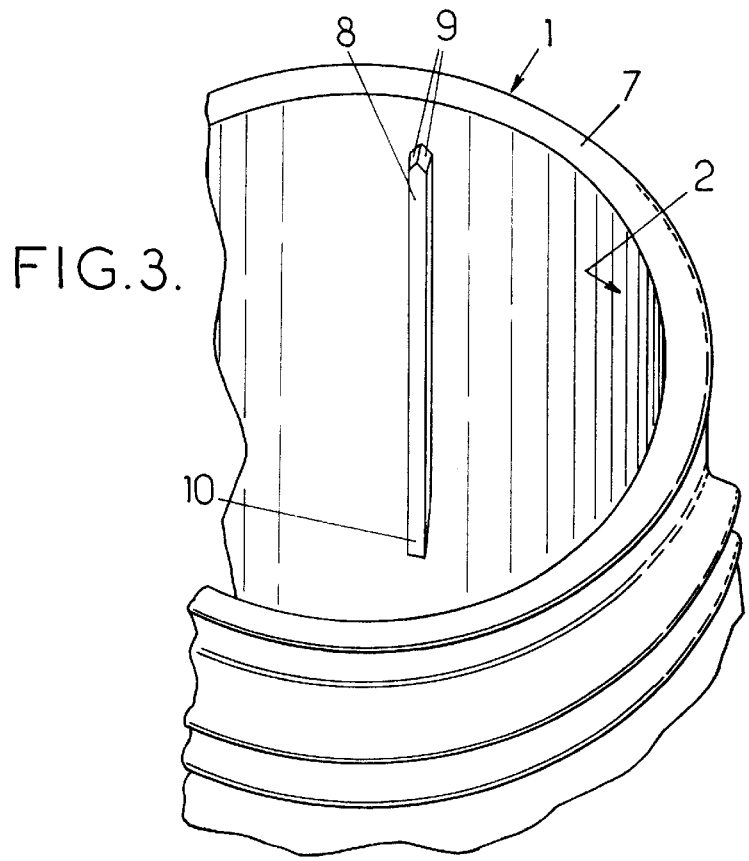
FIG. 3 is a fragmentary perspective view of the top of the neck shown in FIGS. 1 and 2.
Figure 4:
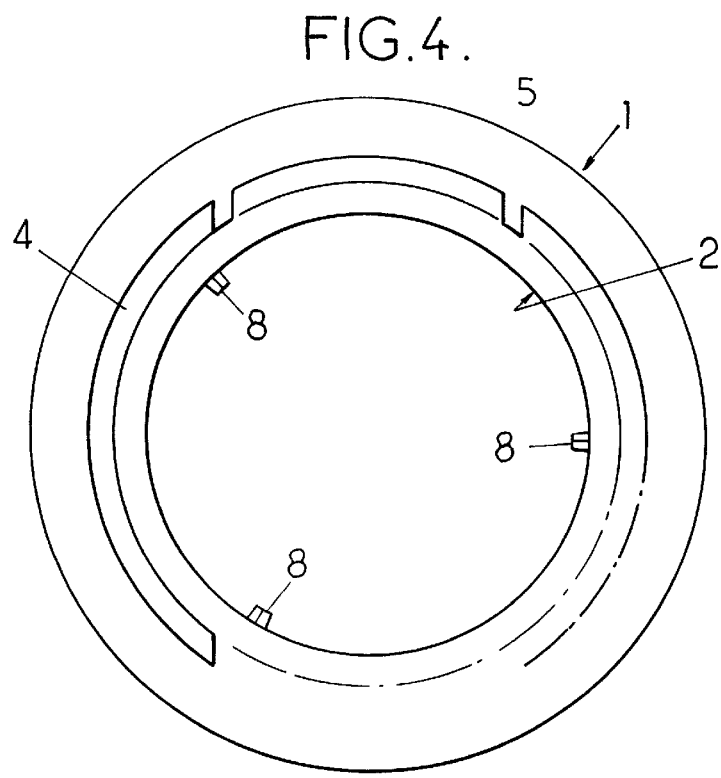
FIG. 4 is a plan view of a preferred variant of the neck of FIGS. 1 to 3.

In the example shown in FIGS. 1 and 3, the foot 10 of the rib engages progressively into the bottom wall 2 which, at this location, is no longer circularly cylindrical, but tapering. A neck is thus provided having one or more inside ribs which, because of their small section and their shape, do not impede unmolding of the preform while it is being fabricated.

Figure 5:
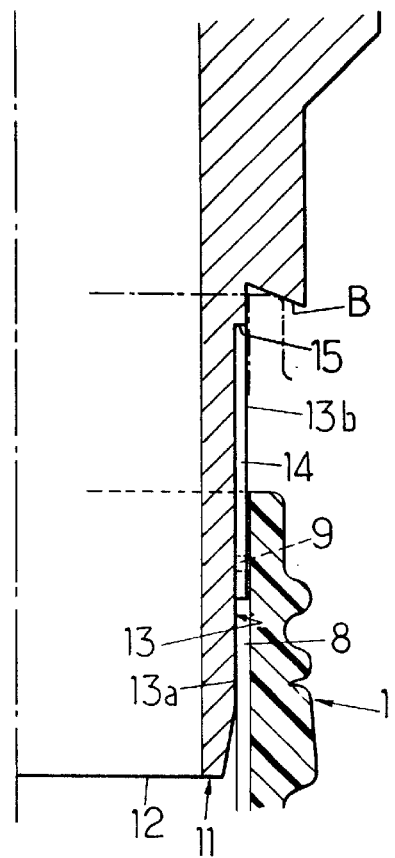
FIG. 5 is a diametrical section view of a mandrel suitable for receiving a neck as shown in FIGS. 1 to 3, and arranged in accordance with the invention.

In FIG. 5, the free end (or leading end) of the mandrel is given reference 12. The mandrel 11 possesses an outside wall 13 whose leading portion 13a (at the bottom of FIG. 5) is substantially smaller in diameter than its trailing portion 13b (at the top of FIG. 5), the portions 13a and 13b being connected together via a substantially radial shoulder 14 suitable for constituting a guide ramp for a projection 8 of the neck 1 engaged on the mandrel 11.

Figure 6:
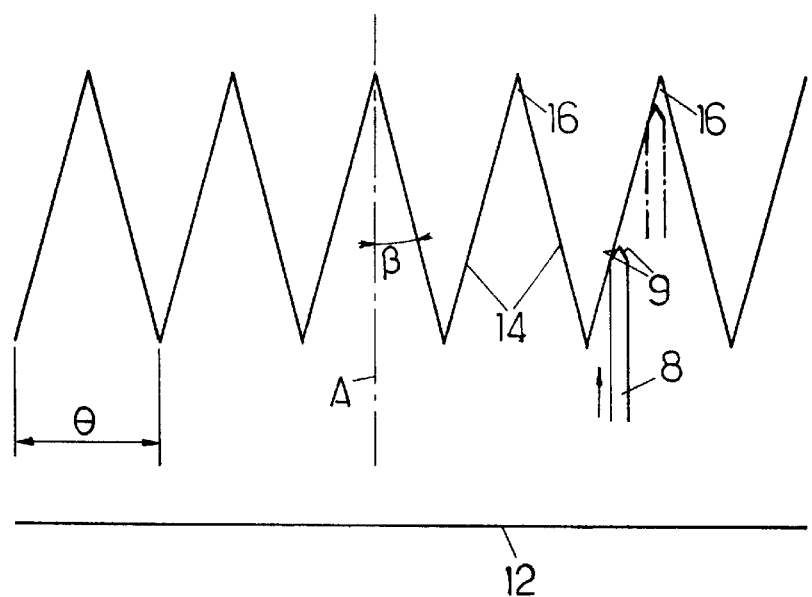
FIG. 6 is a diagrammatic developed view of the outside wall of the FIG. 5 mandrel.

In FIG. 6, the shoulder 14 has at least one length extending at constant inclination β relative to the axis A of the mandrel 11. The inclination β must be relatively small, in other words the slope of the shoulder must be relatively steep so that the projection 8 engaged against said shoulder slides easily along it. In practice, an angle β of not more than 45° seems to be required for reliable operation, and a value of about 30° appears to be quite appropriate.

In the example shown in FIG. 6, the shoulder 14 is constituted by a succession of identical lengths having alternately reversed slopes, thereby constituting a succession of Vs. The inside portions of the tips 16 of the V-shapes formed in this way may constitute abutment means 15 which prevent relative axial displacement of the mandrel and of the neck and which consequently constitute angular abutments imparting an accurate and predetermined angular position to the neck relative to the mandrel. In the typical example shown in FIG. 6, the angular extent between two successive V-shape tips is about 36°, and the angle β is about 30°.

Figure 7:
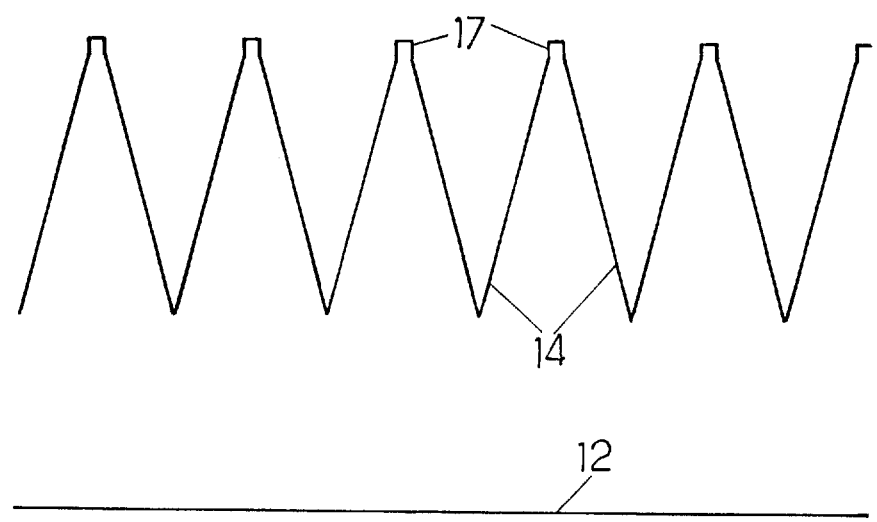
FIGS. 7 and 8 are diagrammatic developed views of variant arrangements for the outside wall of the mandrel.

If it is also desired to ensure that the neck is reliably secured in rotation relative to the mandrel, the V-shape tips 16 may be replaced by longitudinal notches 17 having edges that are substantially parallel and that are suitable for receiving the ends of the projections 8 (FIG. 7).

It will also be observed that in the implementation that is more particularly described, whereby the mandrel is constituted by the end of a blow molding nozzle, it is necessary to provide a sealed connection between the neck and the mandrel. This is achieved by providing the outside wall of the mandrel with an annular projecting lip B which extends transversely to the wall, forming an acute angle therewith, as shown in FIG. 5. Sealing is then obtained by pressing the edge of the neck against the lip B (chain-dotted position in FIG. 5). To ensure that this abutment position is made possible, it is necessary for the projection 8 to avoid coming into contact with the V-shape tip 16 so as to leave a small amount of clearance as shown in chain-dotted lines in FIG. 6. The lip B constitutes an axial abutment which determines the desired angular position for the neck relative to the mandrel.

Figure 8:
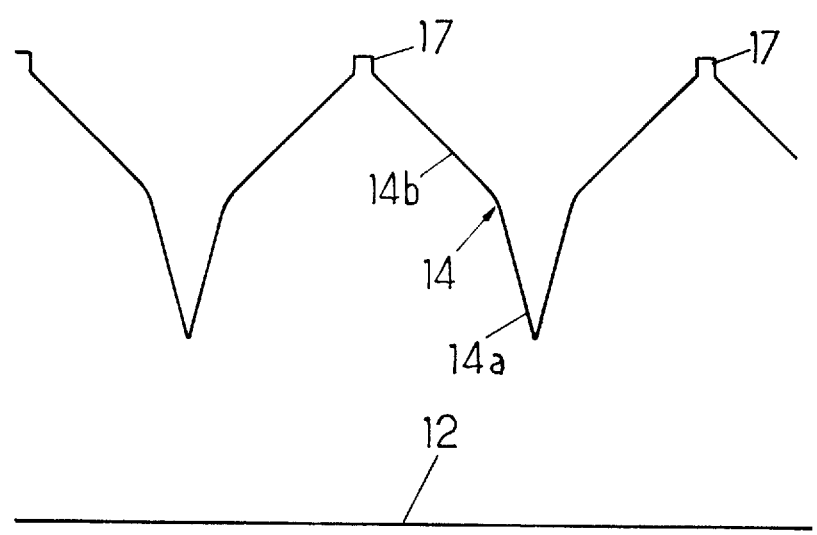

If it is desired to have a large range of rotation for positioning the neck, it is necessary to give the two lengths of shoulder a slope that is smaller. Unfortunately, an inclination of more than 45° appears to be unsatisfactory in causing rotation of the neck on the mandrel while the mandrel is being engaged therein, and also it is not possible to lengthen the longitudinal extent of the shoulder excessively. It thus appears advantageous to make the lengths of shoulder so that they have two different slopes, as shown in FIG. 8: each shoulder 14 thus has a leading portion 14a of relatively steep slope (β<45°) as before so that the neck can start its rotary motion, followed by a trailing portion 14b of a relatively shallower slope (β around or greater than 45°, but preferably not exceeding about 60°).

If the number of lengths of the shoulder 14 is 2n, then the number of possible positions for the neck on the mandrel is n, which positions are angularly spaced apart by 360°/n.

Naturally, and as can be seen from the above, the invention is not limited in any way to those applications and embodiments that have been described more particularly; on the contrary, it extends to any variants thereof. In particular, the person skilled in the art will understand that the projections 8 and the shoulder or lengths of shoulder 14 which are provided in the above example respectively on the inside wall of the neck and on the outside wall of the mandrel could equally well be disposed in an opposite arrangement, namely respectively on the outside wall of the mandrel and on the inside wall of the neck, the technical effects obtained then remaining the same.

I claim:

1. A method of positioning a container or a container preform of thermoplastic material and having a neck with a substantially circular cylindrical inside wall, in a predetermined angular position on a mandrel, comprising providing at least one approximately radial projection on either the inside wall of the neck or the outside wall of the mandrel so that the projection can bear against at least one thrust shoulder provided on whichever of the outside wall of the mandrel or the inside wall of the neck does not have the at least one projection, said shoulder facing respectively towards the free end of the mandrel or the free end of the neck and extending over said wall on which it is positioned while being inclined relative to the axis of the mandrel or the axis of of said neck, respectively, and inserting the mandrel into the neck, thereby causing the neck to rotate relative to the mandrel, rotation being generated by said at least one radial projection sliding against said at least one shoulder, until locking means prevent relative movement of the mandrel and of the container or preform once the neck is disposed in said predetermined angular orientation relative to the mandrel.

2. A method according to claim 1, wherein at least one radial projection is provided on the inside wall of the neck and at least one thrust shoulder is provided on the outside wall of the mandrel, said shoulder facing towards the free end of the mandrel and extending over said outside wall while being inclined relative to the axis of the mandrel.

3. A method according to claim 1 or claim 2, wherein in said inserting step, said neck rotates until the free end of the neck comes into abutment against axial locking means provided on the outside wall of the mandrel, whereby the container or preform is disposed in predetermined annular and axial positions relative to the mandrel.

4. A method according to claim 3, wherein the axial locking means provided on the mandrel are arranged to co-operate in sealed manner with the free end of the neck of the container or preform.

5. A system for positioning a container or a container preform of thermoplastic material, having a neck with a substantially circular cylindrical inside wall, in a predetermined angular position on a mandrel, comprising at least one approximately radial projection positioned on either the inside wall of the neck or the outside wall of the mandrel, at least one thrust shoulder the free end of the mandrel or of the neck for the purpose of positioned on whichever of the outside wall of the mandrel or the inside wall of the neck does not have the at least one projection, said shoulder facing respectively towards the free end of the mandrel or the free end of the neck and extending over the wall on which it is positioned while being inclined relative to the axis of the mandrel or the axis of the neck, respectively, and locking means arranged to stop relative movement of the mandrel and of the neck when said neck is disposed in a predetermined angular orientation relative to the mandrel.

6. A system according to claim 5, wherein the inside wall of the neck includes at least one approximately radial projection and the outside wall of the mandrel includes at least one thrust shoulder facing towards the free end of the mandrel for the purpose of guiding said radial projection of the neck, said shoulder extending over the outside wall of the mandrel and being inclined relative to the axis of the mandrel.

7. A system according to claim 5 or claim 6, wherein the locking means are axial locking means provided on the outside wall of the mandrel and suitable for receiving in abutment the free end of the neck when the mandrel is inserted in the neck.

8. A system according to claim 7, wherein the axial locking means are arranged to receive the free end of the neck in sealed axial abutment.

9. A system according to claim 5, wherein the wall having the at least one thrust shoulder has an even number 2n of shoulders that are circumferentially distributed and that have alternately opposite inclinations to form successive Vs enabling the angular position of the neck relative to the mandrel to be predetermined to within an angle of $360°/n$.

10. A system according to claim 5 or claim 6, wherein the locking means comprise the insides of the tips of the V-shapes formed by two successive lengths of the shoulder.

11. A system according to claim 9, wherein the wall provided with the shoulders possesses a leading portion of diameter that is smaller than the diameter of its trailing portion, which leading and trailing portions are connected together, forming the successive Vs.

12. A system according to claim 5, further including means for constraining the neck to rotate together with the mandrel, comprising at least one longitudinally extending notch situated at the trailing end of the shoulder and shaped to receive at least a portion of the projection.

13. A system according to claim 5, wherein the at least one radial projection has a leading end which possesses at least one cut flat.

14. A system according to claim 5, characterized in that the at least one shoulder extends with an inclination ($\beta$) that is substantially constant relative to the axis of the mandrel or of the neck.

15. A system according to claim 5, wherein the at least one shoulder extends with an inclination ($\beta$) that varies relative to the axis of the mandrel or of the neck, said inclination being smaller in value close to a leading end of the mandrel or of the neck, respectively.

16. A system according to claim 14 or claim 15, wherein the inclination ($\beta$) of the shoulder in the vicinity of the leading end of the mandrel is not more than 45°.

17. A system according to claim 5, wherein a plurality of approximately radially extending projections are provided that are substantially regularly spaced apart circumferentially.

18. A system according to claim 5, wherein the at least one approximately radial projection is constituted in the form of a rib extending longitudinally on the inside wall of the neck.

* * * * *